United States Patent
Ide et al.

(10) Patent No.: US 8,682,633 B2
(45) Date of Patent: Mar. 25, 2014

(54) COST EVALUATION AND PREDICTION

(75) Inventors: Tsuyoshi Ide, Yamato (JP); Hiroki Yanagisawa, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/516,884

(22) PCT Filed: Nov. 17, 2010

(86) PCT No.: PCT/JP2010/070503
§ 371 (c)(1),
(2), (4) Date: Jun. 18, 2012

(87) PCT Pub. No.: WO2011/074369
PCT Pub. Date: Jun. 23, 2011

(65) Prior Publication Data
US 2012/0265508 A1    Oct. 18, 2012

(30) Foreign Application Priority Data
Dec. 18, 2009   (JP) ................................ 2009-287182

(51) Int. Cl.
*G06F 17/50*    (2006.01)

(52) U.S. Cl.
USPC ............................. 703/13; 709/223; 709/238

(58) Field of Classification Search
USPC ............. 703/6, 13; 706/21; 709/224; 701/70, 701/118
See application file for complete search history.

(56) References Cited

U.S. PATENT DOCUMENTS

| | | | |
|---|---|---|---|
| 6,411,946 B1 * | 6/2002 | Chaudhuri | 706/21 |
| 2008/0114542 A1 | 5/2008 | Nambata et al. | |
| 2008/0147307 A1 * | 6/2008 | Liu et al. | 701/118 |
| 2008/0294331 A1 | 11/2008 | Fushiki et al. | |
| 2010/0165880 A1 | 7/2010 | Qiang et al. | |

(Continued)

FOREIGN PATENT DOCUMENTS

| | | |
|---|---|---|
| JP | 07-098794 | 4/1995 |
| JP | 10-134018 | 5/1998 |

(Continued)

OTHER PUBLICATIONS

Interview Summary mailed Jul. 8, 2013 for U.S. Appl. No. 13/589,565, 3 pages.

(Continued)

*Primary Examiner* — Kandasamy Thangavelu
(74) *Attorney, Agent, or Firm* — Francis Lammes; Stephen J. Walder, Jr.; Jennifer R. Davis

(57) ABSTRACT

A mechanism is provided for enabling prediction of a cost between an origin and a destination even in the case of insufficient past route information. Data D, which includes an origin, a destination, and information on cost between these points, is prepared as well as a subroutine for calculating cost $c_e$ along an arbitrary link e on the basis of the set along with a variable denoted by $f_e$. In the first step, the minimum cost route is found from the current $\{f_e\}$ with respect to all pairs of the origin and the destination included in the data D, thereby forming transformed data D'. $\{f_e\}$ is recalculated by using the above subroutine from D' by computer processing and then compared with $\{f_e\}$ calculated last time. If a change is equal to or greater than a threshold, control returns to finding the minimum cost route. Otherwise, $\{f_e\}$ is fixed.

13 Claims, 6 Drawing Sheets

(56) References Cited

U.S. PATENT DOCUMENTS

2010/0228459 A1* 9/2010 Mizuno et al. .................. 701/70
2011/0113155 A1 5/2011 Kuznetsov et al.
2013/0024561 A1* 1/2013 Imai .............................. 709/224

FOREIGN PATENT DOCUMENTS

| JP | 2000-011290 | 1/2000 |
|---|---|---|
| JP | 2002-367071 | 12/2002 |
| JP | 2005-208791 | 8/2005 |
| JP | 2008-282161 | 11/2008 |
| JP | 2010-072986 | 4/2010 |

OTHER PUBLICATIONS

Office Action mailed Apr. 9, 2013 for U.S. Appl. No. 13/589,565, 27 pages.

UK Examination Report, Application No. GB1209503.0 dated Sep. 20, 2012, 2 pages.

Chapelle, Oliver et al., "Semi-Supervised Learning", Label Propagation and Quadratic Criterion, MIT Press, Chapter 11, http://141.105.33.55/~lomov/library/bigdvd/dvd38/Chapelle%20O.%20(Ed),%20Scholkopf%20B.%20(Ed),%20Zien%20A.%20(Ed)%20-%20Semi-Supervised%20Learning(2006)(508).pdf, 2006, pp. 193-216.

Srebro, Nathan et al., "Maximum-Margin Matrix Factorization", Advances in Neural Information Processing Systems (NIPS), http://ttic.uchicago.edu/~nati/Publications/MMMFnips04.pdf, Dec. 2004, 8 pages.

U.S. Appl. No. 13/589,565.

Response to Office Action dated Nov. 5, 2012, International Application No. GB1209503.0, 7 pages.

Response to Office Action filed Jul. 9, 2013, U.S. Appl. No. 13/589,565, 9 pages.

Notice of Allowance mailed Jul. 25, 2013 for U.S. Appl. No. 13/589,565; 16 pages.

* cited by examiner

COST EVALUATION AND PREDICTION

BACKGROUND

The present invention relates to a system, a method, and a program for evaluating or predicting costs such as the travel time along a certain route, energy consumption, and $CO_2$ emission in a route on road networks.

In recent years, growing attention has been paid to predictive modeling of transportation traffic for better city planning. In this context, intelligent transportation systems (ITS) have been extensively studied particularly from the late 1990 s.

In ITS, systematically predicting the travel time along a route chosen is of crucial importance since approximately predicting the travel time of an arbitrary route is useful to reduce the energy and carbon footprint of a drive.

In addition to travel-time, predicting other types of costs such as energy consumption and $CO_2$ emission along a route is often required in ITS. To predict the cost, the following conventional techniques are known.

Japanese Patent Application Publication No. 2002-367071 discloses a technique for collecting and recording links (roads each connecting intersections adjacent to each other), congestion level data at each time of day, and travel time data at each time of day in the section, which are necessary to determine an average speed at each congestion level, determining an arrival time at each link and its congestion level data at the time of day by using the average speed at each congestion level assumed based on the definition of the congestion level, calculating an average speed at each congestion level by using the congestion level data of each link at the determined arrival time for each link, dividing a congestion level length by each congestion level average speed by using the calculated average speed at each congestion level, and adding up the obtained values to find the travel time.

Japanese Patent Application Publication No. 2005-208791 discloses a road link travel time estimating device which finds an n-th order transformation function for calculating the travel time of individual road links based on a road link congestion level by using a relationship between the past road link travel time and a road link congestion level, finds an n+1 multiple regression equations for calculating the coefficients of the transfer function from road attribute information by performing a multiple regression analysis with the coefficient of the transformation function as a target variable and with the road attribute information as an explanatory variable, calculates the coefficient of the transformation function by assigning the road attribute information of the road link to be subjected to the road link travel time estimation to the multiple regression equations, applies the coefficient to the transformation function, and calculates an estimated value of the road link travel time by assigning the road link travel-jam level at the moving time to the transformation function.

Japanese Patent Application Publication No. 2008-282161 discloses a technique for calculating a coefficient of a first transform for calculating normalized link travel time by using a relationship between a calculated past link congestion level and the normalized link travel time, finding a regression equation by using a mixed model of multiple regression analysis and quantification theory class I analysis with the coefficients of the first transform as variables, calculating a coefficient of a second transform by applying the calculated congestion level to be subjected to travel time estimation to the regression equation, calculating an estimated value of the normalized link travel time to be subjected to the travel time estimation by applying the calculated coefficient to a second transform, and calculating an estimated value of the road link travel time on the basis of the normalized link travel time.

Although the technique disclosed in Japanese Patent Application Publication No. 2002-367071 provides a method for computing the travel time, it assumes that the average speed remains unchanged along a route (independently of the links) and such an assumption will be unrealistic. Therefore, satisfactory prediction accuracies are not expected from the method.

The techniques in Japanese Patent Application Publication No. 2005-208791 and its improvement, Japanese Patent Application Publication No. 2008-282161 are to predict the travel time on the basis of the congestion levels of the respective links. However, the assumption that the congestion level of all the links in a route is measurable strongly limits the utility of the method, or in some cases, may be too unrealistic to assume.

BRIEF SUMMARY

Therefore, one of the objects of the present invention is to provide a technique that enables to predict the cost between an origin and a destination even in the case that individual link costs are not necessarily directly recorded on past routes.

The other object of the present invention is to provide a technique that enables to predict an appropriate route between an origin and a destination even in the case that individual link costs are not necessarily directly recorded on past routes.

According to the present invention, there is prepared data D, which includes a set of an origin, a destination, and the cost between them. In addition, when a set of (a route, the cost of the route) is supplied as training data, a subroutine is prepared to calculate the individual cost $c_e$ of an arbitrary link e based on the dataset.

In the above, $c_e$ can be a linear function of a variable $f_e$.

The function $c_e$ is defined so that $f_e=0$ corresponds to a known baseline driving mode such as cruising based exactly on the legal speed limits. In such a baseline mode, the cost of the individual links is known, and thus the cost along an arbitrary route is readily computed.

Then, the present invention proceeds to the steps that are basically performed by a computer, as described below.

In the first step, a user inputs an origin and a destination for calculating the cost with an appropriate mouse or other user interfaces.

In the next step, the variable $f_e$ is initialized to zero for all of the links {e} by computer processing.

In the subsequent step, the minimum cost route is found using the current values of the variables $\{f_e\}$ for all pairs of the origin and the destination included in the data D by computer processing. As a result, the data D is transformed to the set of (a route, the cost of the route). Now, having performed this transformation, the transformed data is denoted by D'.

In the next step, $\{f_e\}$ is recalculated by using the above-mentioned subroutine from D' by computer processing.

Here, the values of $\{f_e\}$ calculated this time is compared with $\{f_e\}$. calculated last time. If the change between them is greater than a threshold value, the control returns to the step of finding the minimum cost route. For thresholding, an appropriate norm such as the max norm can be used to evaluate the magnitude of the vector $f_{this\ time}-f_{last\ time}$ having the dimension same as the size of the set $\{f_e\}$.

Based on the calculated $\{f_e\}$, the minimum cost route between a and b, two arbitrary chosen nodes in a road network, is found, the cost y along the route is obtained though the functional relationship between $f_e$ and $c_e$. At this point, a rational route between a and b is also output as a by-product.

According to the present invention, even if the information on the past route is incomplete in the sense that individual link costs are not directly observed, it is possible to predict the cost such as the travel time between an origin and a destination. Moreover, a rational route between the origin and the destination is also obtained in the course of calculation.

DETAILED DESCRIPTION

Figure 1:
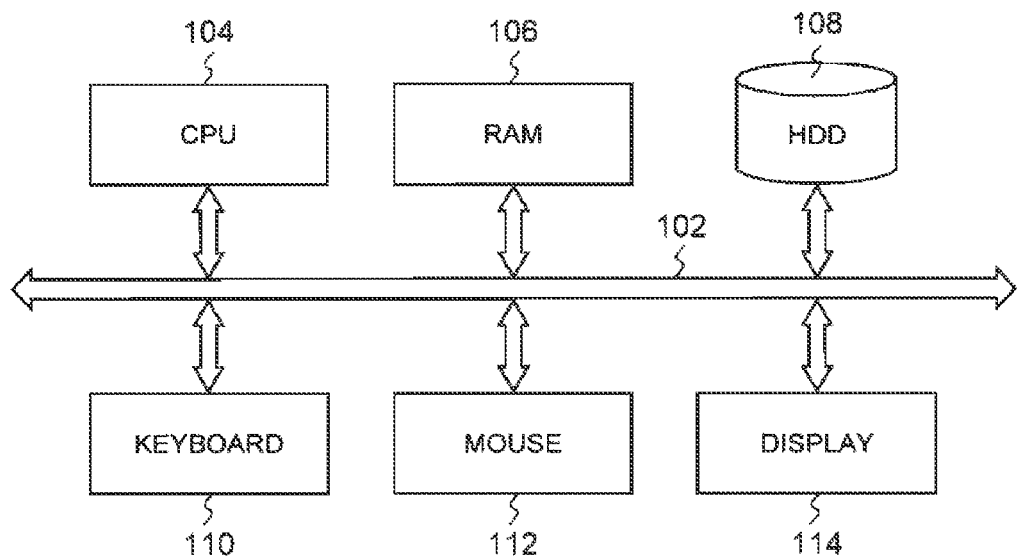
FIG. 1 is a block diagram illustrating an example of a hardware configuration for practicing the present invention.

Hereinafter, the embodiments of the present invention will be described in detail in accordance with the accompanying drawings. It should be understood that the following description is merely of preferred embodiments of the present invention and is not intended to limit the present invention to the contents described in this specification. Unless otherwise specified, the same reference numerals denote the same elements throughout the drawings.

Referring to FIG. 1, shown is a block diagram of computer hardware for achieving a system configuration and processing according to one embodiment of the present invention. In FIG. 1, a system bus 102 is connected to a CPU 104, a main memory (RAM) 106, a hard disk drive (HDD) 108, a keyboard 110, a mouse 112, and a display 114. The CPU 104 is preferably based on a 32-bit or 64-bit architecture. For example, it is possible to use Pentium™ 4 or Core™ 2 Duo of Intel Corporation, Athlon™ of Advanced Micro Devices, Inc., or the like. The main memory 106 preferably has a capacity of 1 GB or more and more preferably 2 GB or more.

The hard disk drive 108 previously stores an operating system. The operating system may be an arbitrary one compatible with the CPU 104, such as Linux™, Windows 7™, Windows XP™, or Windows™ 2000 of Microsoft Corporation, or Mac OS™ of Apple Computer.

Moreover, the hard disk drive 108 further stores data D of the past history of routes and cost and processing programs according to one embodiment of the present invention. The data D of the past history and the processing programs will be described in more detail later with reference to FIG. 2. The hard disk drive 108 may store map information data and a program for displaying this or may be connected to the Internet via a communication card and a predetermined server, though not shown, so as to use map information data usable on the Internet.

The keyboard 110 and the mouse 112 are used to operate graphic objects such as an icon, a task bar, a window displayed on the display 114 conforming to the graphic user interface provided by the operating system. The keyboard 110 and the mouse 112 are also used for a user to input the origin and the destination or to start or exit the program according to an embodiment of the present invention.

The display 114 is preferably a 32-bit true color LCD monitor having a resolution of 1024×768 or more, though not limited thereto. The display 114 is used to display a map including a route for which the travel time or other costs are predicted.

Figure 2:
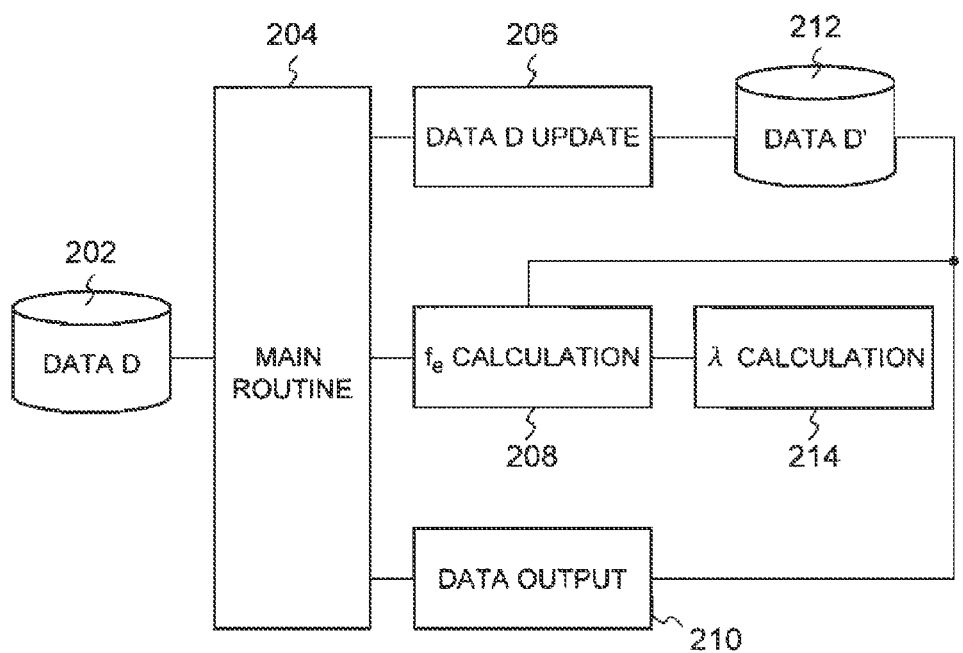
FIG. 2 is a functional block diagram illustrating a processing routine for practicing the present invention.

Then, the configuration of the functional and logical block diagram according to the present invention will be described with reference to FIG. 2. In FIG. 2, data D 202 is past historical data along a target route and can be represented as follows:

$$D = \{((a^{(n)}, b^{(n)}), y^{(n)}) | n=1, 2, \ldots, N\}$$

where $a^{(n)}$ is the origin of the n-th route, $b^{(n)}$ is the destination of the n-th route, and $y^{(n)}$ is the cost recorded from $a^{(n)}$ to $b^{(n)}$. Note here that various definitions of the cost are possible, such as the travel time, energy consumption, and $CO_2$ emission, though the present invention focuses mainly on the travel time for convenience of description.

For the method of recording the past historical data, for example, a GPS (global positioning system) can be used upon departure for identifying the location of the origin node $a^{(n)}$ of a route. Then, on arrival to the destination, the GPS records the location of the destination node $b^{(n)}$. Further, by using the time stamps of the GPS records, the time $y^{(n)}$ spent from the location $a^{(n)}$ to the location $b^{(n)}$ is obtained. Finally, by sequentially recording a tuple $((a^{(n)}, b^{(n)}), y^{(n)})$ for each of n=1, 2, ..., N, the data D is obtained. Alternatively, the data D can be prepared using probe car data. Note that the input data in the present invention is not limited to a particular data collecting method.

It is important in the above that, according to the present invention, there is no need to record the intermediate route from the origin $a^{(n)}$ to the destination $b^{(n)}$. Moreover, when a target road is represented by a sequence on a road network, it is unnecessary to record the elapsed time on individual edges from the origin $a^{(n)}$ to the destination $b^{(n)}$. According to the present invention, it is possible to predict the travel time from an arbitrary origin to an arbitrary destination even when no information on the intermediate links of a route is available. In addition, it is possible to predict the route as a byproduct.

Figure 3:
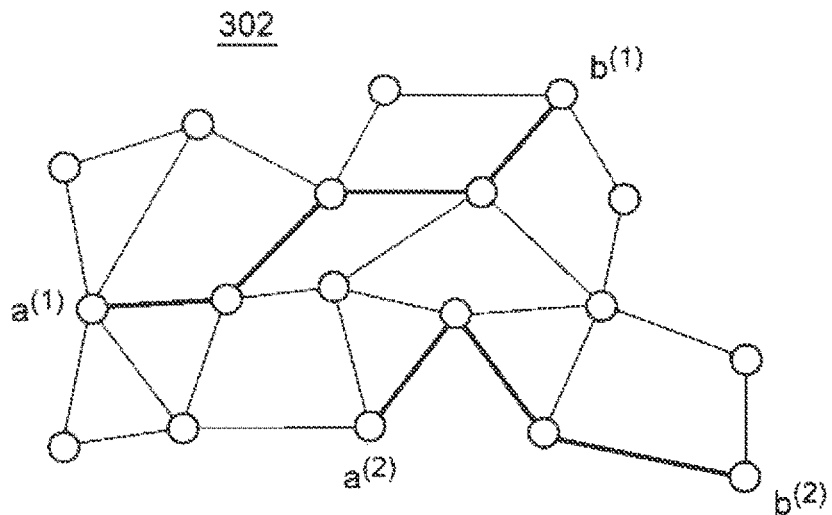
FIG. 3 is a diagram illustrating an example of data on a route.

FIG. 3 shows (the origin, the destination)=$(a^{(1)}, b^{(1)})$ and $(a^{(2)}, b^{(2)})$ on a target route 302.

The route is based on the following appropriate premises:
1. A driver makes rational route selection. Specifically, the driver drives on the minimum cost route.
2. A traffic jam spreads. Specifically, there is some effect on links adjacent to the links (edges) where an unusual state occurs.

While the data format in which the data D 202 is recorded into the hard disk drive is not particularly limited as long as it is computer-readable, it is preferable to use a generally well-known data format such as, for example, CSV and XML.

In FIG. 2, a main routine 204 reads data D information and appropriately calls a data D update routine 206, an $f_e$ calculation routine 208, and an output routine 210 to perform predetermined processing.

The data D update routine 206 receives data of the data D passed from the main routine 204, generates augmented data D' 212 by using a parameter value $\{f^e\}$ corresponding to the cost associated with an edge, and records the augmented data D' 212 into the hard disk drive 108. The data of the parameter value $\{f^e\}$ is prepared throughout e∈E where E is a set of route edges. The data D' 212 is also recorded using a generally well-known data format such as CSV or XML similarly to the data D 202.

The augmented data D' is expressed as follows:

$$D'=\{((a^{(n)}, b^{(n)}), x^{(n)}, C(x^{(n)}))|n=1,2,\ldots,N\}$$

where $x^{(n)}$ is a sequence of links on the road network, and thus represents a route. $C(x^{(n)})$ is a cost value along $x^{(n)}$. The meanings of other notations are the same as those of the data D. In FIG. 3, a route from the origin to the destination is indicated by a thick line. This route is calculated in step 406 described later.

The $f_e$ calculation routine 208 calculates updated $\{f_e\}$ from the value of $\{f_e\}$ passed from the main routine 204 and the value of the data D' 212. The $f_e$ calculation routine 208 calls a λ calculation routine 214 to calculate a parameter λ used for the calculation.

The main routine 204 receives the value of $\{f_e\}$ calculated by the $f_e$ calculation routine 208 and passes it to the data D update routine 206.

The data output routine 210, which is appropriately called from the main routine 204, has a function of displaying a predicted value of the travel time and a predicted route between the origin and the destination specified by the keyboard 110 and the mouse 112 on the display 114 on the basis of the data D' recorded in the hard disk drive 108.

The main routine 204, the data D update routine 206, the $f_e$ calculation routine 208, the data output routine 210, and the λ calculation routine 214 are compiled in a known programming language such as C, C++, C#, or Java(R) and stored in the hard disk drive 108 as executable files and, if necessary, each routine is called to the main memory 106 by an action of the operating system in response to a user's operation and then executed.

Next, referring to FIG. 4 and subsequent flowcharts, processing of the routine shown in the functional block diagram of FIG. 2 will be described below.

Figure 4:
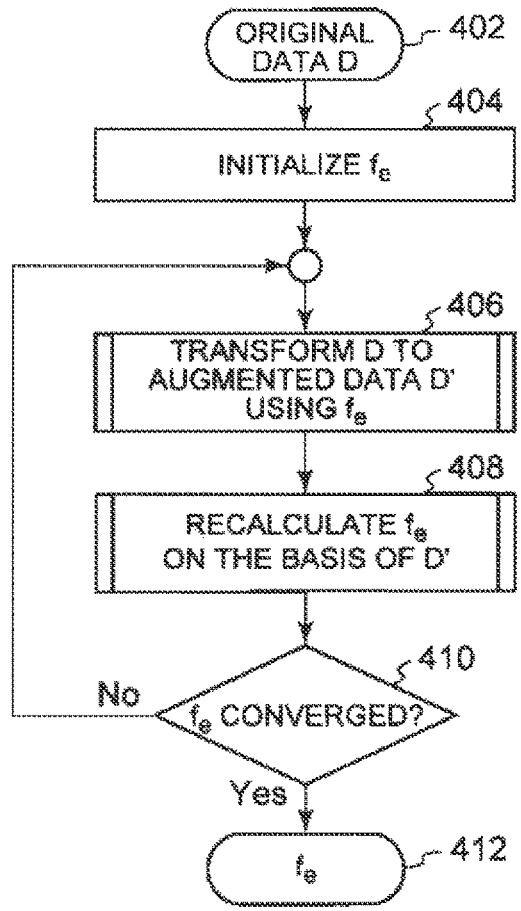
FIG. 4 is a flowchart of main routine processing.

FIG. 4 is a flowchart illustrating the processing of the main routine 204. In FIG. 4, the main routine 204 reads original data D in step 402.

In step 404, the main routine 204 sets all elements of $\{f_e|e \in E\}$ to zero. In the context in this embodiment, the cost distribution represented by the relation $f_e=0$ corresponds to driving at the legal speed limit of individual links. Therefore, $f_e=0$ means that the average driving condition deviates from the legal speed drive. While data of $\{f_e\}$ is preferably stored in a predetermined area of the main memory 106, the data may be stored in the hard disk drive 108.

In step 406, the main routine 204 calls the data D update routine 206 and transforms the data D to augmented data D' by using $f_e$. The data D update routine 206 will be described in more detail with reference to the flowchart shown in FIG. 5.

In step 408, the main routine 204 calls the $f_e$ calculation routine 208 and recalculates $\{f_e\}$ on the basis of the data D'. The $f_e$ calculation routine 208 will be described in more detail later with reference to the flowchart of FIG. 6.

In step 410, the main routine 204 determines whether $\{f_e\}$ converges. Supposing that $\{f_e\}$ calculated last time is retained in the main routine 204 and that newly calculated $\{f_e\}$ is considered as $\{f_e\}$, the convergence is considered if a distance between $\{f_e\}$ and $\{f_e\}$, which is calculated with an appropriate norm such as the max norm, is smaller than a predetermined threshold.

If it is considered that the value has not converged yet, the main routine 204 returns to step 406 with the newly calculated $\{f_e\}$ and calls the data D update routine 206 again.

If the main routine 204 determines that $\{f_e\}$ converges in step 410, the processing completes and the step 412 for $\{f_e\}$ is fixed. Since $f_e$ is given to all links of the road, it is possible to find a travel time and the route between arbitrary two points on a road 302 by an arbitrary method such as the Dijkstra method.

Figure 5:
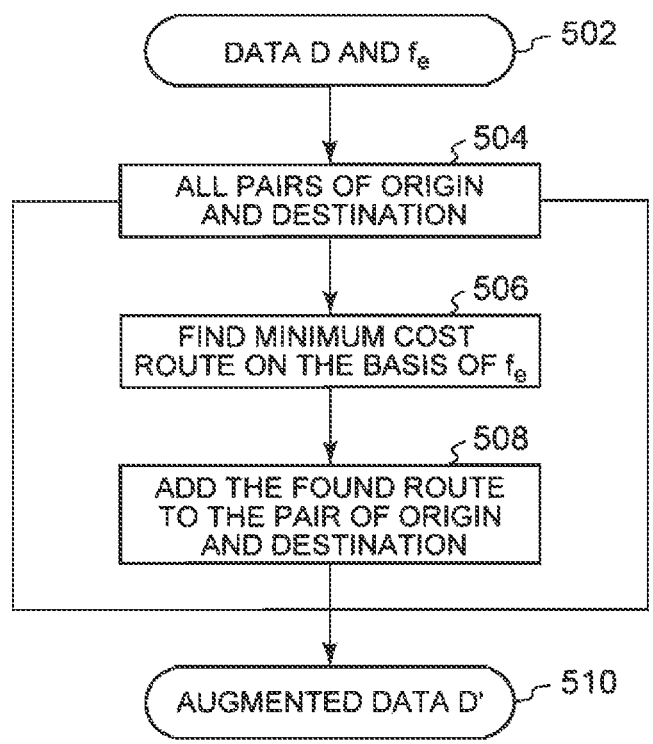
FIG. 5 is a flowchart of data D calculation routine processing.

FIG. 5 is a flowchart illustrating processing of the data D update routine 206. As shown in step 502, the data D update routine 206 inputs data D and $\{f_e\}$. It is to be understood that the term "data D" is used only in a situation where the data D update routine 206 is called for the first time when the control proceeds to step 406 from step 404 in FIG. 4, but the data D is replaced with data D' in the second and subsequent calls of the data D update routine 206.

In the flowchart of FIG. 5, steps 506 and 508 are performed for all pairs of the origin and the destination as shown in step 504. The term "pairs of the origin and the destination" means $(a^{(n)},b^{(n)})$ in data $D=\{((a^{(n)},b^{(n)}),y^{(n)})|n=1,2,\ldots,N\}$. The character N indicates the number of pairs of the origin and the destination as past historical data. In other words, in the case of the data D, steps 506 and 508 are performed N times.

The data D update routine 206 finds the minimum cost route between the pair of the origin and the destination on the basis of $\{f_e\}$ in step 506. It is the normal shortest route finding with $\{f_c\}$ used as a weight, and an arbitrary existing shortest route finding algorithm such as the Dijkstra method, the A* method, or the Warshall-Floyd method can be used for this purpose.

The data D update routine 206 generates data D' by adding the route $x^{(n)}$ between the origin and the destination obtained in this manner and the cost $C(x^{(n)})$ of the route in step 508.

The cost C(x) is calculated for the route x as follows:

$$C(x) = \sum_{e \in x} c_e(f_e) \qquad [\text{Eq. 1}]$$

An example of a specific definition of the $c_e(f_e)$ equation is as follows:

$$c_e(f_e)=l_e(f_e+f_e^0)$$

where $f_e$ is a deviation from the baseline cost per unit length and is an unknown quantity, $f_e^0$ is the baseline cost (known quantity) per unit length, which is typically estimated from a reference condition such as cruising based exactly on the legal speed limit of each link, and $l_e$ is the length of the link e and a known quantity.

After steps 506 and 508 are performed for all pairs of the origin and the destination, the augmented data D' with calculated minimum-cost routes is obtained in step 510 as follows:

$$D'=\{((a^{(n)},b^{(n)}),x^{(n)},C(x^{(n)}))|n=1,2,\ldots,N\}$$

Figure 6:
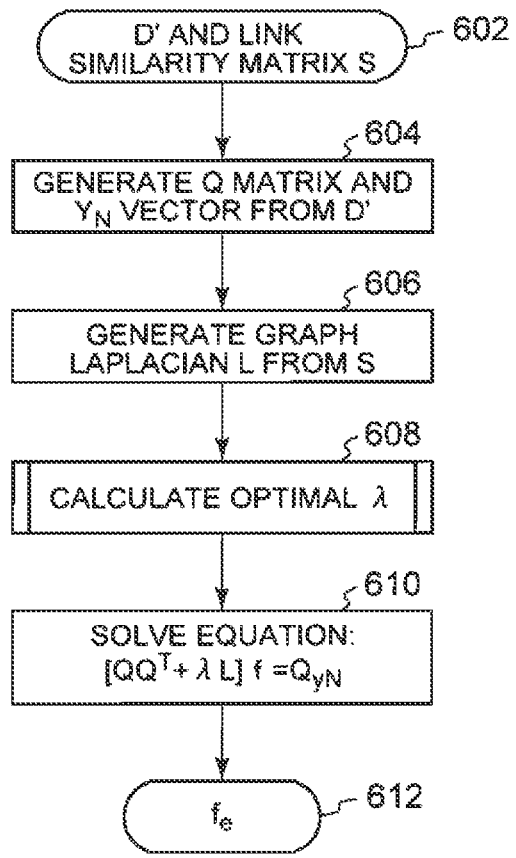
FIG. 6 is a flowchart of $F_e$ calculation routine processing.
Figure 7:
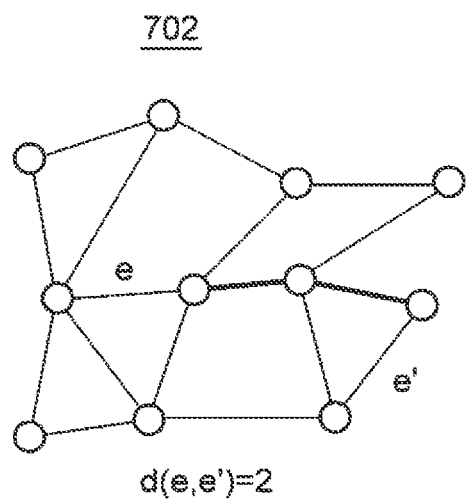
FIG. 7 is a diagram for describing d(e, e') function.

Subsequently, the processing of the $f_e$ calculation routine 208 will be described below with reference to the flowchart of FIG. 6. While D' and a similarity matrix S are used in step 602 of FIG. 6, the following description focuses only on the similarity matrix S since D' is known. The similarity between a link e and another link e' is generally defined as a decreasing function of a distance d(e,e') between the link e and the link e'. Although the definition of d(e,e') and therefore the definition of the similarity have some arbitrariness, one preferred embodiment is given as follows:

$$S_{e,e'}=\gamma^{1+d(e,e')}$$

where d(e,e') is the number of links passed to reach the link e' from the link e with the shortest route length. In an example 702 shown in FIG. 7, d(e,e')=2. The thick line is a link connecting the link e and the link e'. γ is a given positive number that is less than 1. For example, γ can be 0.5. If d(e,e') exceeds a certain value, it is reasonable to set $S_{e,e'}$ to be 0. For example, if d(e,e')>3, $S_{e,e'}$ is defined as 0.

The $f_e$ calculation routine 208 generates a Q matrix and a vector $y_N$ from D' as described below in step 604. First, the following is obtained, first, instead of $y^{(n)}$:

$$y\sim^{(n)} \equiv y^{(n)} - \sum_{e \in x^{(n)}} l_e f_e^0 \qquad [\text{Eq. 2}]$$

The vector $y_N$ is defined as an N-dimensional column vector whose n-th entry is $y\sim^{(n)}$. Specifically, $y_N$ is given as $y_N = [y\sim^{(1)}, y\sim^{(2)}, \ldots, y\sim^{(n)}]^T$. $l_e$ has been defined as the length of the link e.

Then, to represent a route, an indicator vector $q \in R^M$ is defined as an indicator vector representing the length of the road as follows:

$$q_e^{(n)} = \begin{cases} l_e & \text{for } e \in x^{(n)} \\ 0 & \text{Others} \end{cases} \qquad [\text{Eq. 3}]$$

Then, by arranging these N indicator vectors as column vectors, the Q matrix is defined as:

$$Q = [q^{(1)}, \ldots, q^{(N)}]$$

The $f_e$ calculation routine 208 generates a matrix L from S in step 606 by using a formula described below. This type of matrix is generally referred to as "graph Laplacian."

$$L_{i,j} \equiv \delta_{i,j} \sum_{k=1}^{M} S_{i,k} - S_{i,j} \qquad [\text{Eq. 4}]$$

where M is the total number of links on the map and $\delta_{ij}$ is the Kronecker delta.

Subsequently, the $f_e$ calculation routine 208 calls the λ calculation routine 214 in step 608 to determine the optimal value of λ. The details of the λ calculation routine 214 will be described later with reference to the flowchart of FIG. 8 and, assuming here that the value of λ is determined, the control proceeds to step 610.

The following objective function is used as the premise of step 610:

$$\Psi_{\alpha,\beta}(f|\lambda) = \sum_{n=1}^{N} \left| y^{(n)} - \sum_{c \in x^{(n)}} c_e(f_e) \right|^\alpha + \lambda \sum_{e=1}^{M} \sum_{e'=1}^{M} S_{e,e'} |f_e - f_{e'}|^\beta. \qquad [\text{Eq. 5}]$$

On the left-hand side of this equation, f is a column vector whose entries are $\{f_e\}$. On the right-hand side of this equation, the first term is a loss function, and the second term is a penalty function for discrepancies between the neighboring links, multiplied by λ.

In this objective function, a preferable (α,β) is (1,1) or (2,2).

If (α,β)=(1,1), the objective function is as follows:

$$\Psi_{1,1}(f|\lambda) = \sum_{n=1}^{N} \left| y^{(n)} - \sum_{c \in x^{(n)}} c_e(f_e) \right| + \lambda \sum_{e=1}^{M} \sum_{e'=1}^{M} S_{e,e'} |f_e - f_{e'}| \qquad [\text{Eq. 6}]$$

Since this is a linear function, finding the minimum of this objective is reduced to solving a linear programming problem and it is possible to find the optimal solution easily by using a commercial solver. An advantage compared with the case of (α,β)=(2,2) is that the objective function in this case is robust against outliers. Traffic data generally contains a lot of outliers (such as a route behaving exceptionally) and therefore this property is preferable from a practical viewpoint.

On the other hand, if (α,β)=(2,2), the objective function is as follows:

$$\Psi_{2,2}(f|\lambda) = \sum_{n=1}^{N} \left| y^{(n)} - \sum_{c \in x^{(n)}} c_e(f_e) \right|^2 + \lambda \sum_{e=1}^{M} \sum_{e'=1}^{M} S_{e,e'} |f_e - f_{e'}|^2 \qquad [\text{Eq. 7}]$$

This equation is able to be solved as described below. First, from the already given definitions of Q, L, and $y_N$, the following equation is satisfied:

$$\text{the } n\text{-}th \text{ component of } Q^T f = y^{(n)} - \sum_{e \in x^{(n)}} c_e(f_e) \qquad [\text{Eq. 8}]$$

Therefore, the following equation is satisfied:

$$\frac{1}{2} \sum_{n=1}^{N} \left( y^{(n)} - \sum_{e \in x^{(n)}} c_e(f_e) \right)^2 = \frac{1}{2} \|y_N - Q^T f\|^2 \qquad [\text{Eq. 9}]$$

On the other hand, regarding the penalty term, by simply expanding the square, and by arranging the terms, the following is obtained:

$$\frac{1}{4} \sum_{e=1}^{M} \sum_{e'=1}^{M} |f_e - f_{e'}|^2 = \frac{1}{2} f^T L f \qquad [\text{Eq. 10}]$$

According to the above, the objective function is transformed as follows:

$$\Psi(f|\lambda) = \frac{1}{2} \|y_N - Q^T f\|^2 + \frac{\lambda}{2} f^T L f. \qquad [\text{Eq. 11}]$$

If the above is differentiated with respect to f and set the derivative equal to zero, the following equation is obtained:

$$[QQ^T + \lambda L]f = Q_{y_N} \qquad [\text{Eq. 12}]$$

The above is the equation described in step 610. This equation is a simultaneous linear equation and therefore is able to be solved more easily than the linear programming problem. As the solution of a simultaneous linear equation, the Gauss-Seidel method has been conventionally known. In this case, however, the matrix on the left-hand side is generally a sparse matrix, and the simultaneous linear equation can be extremely efficiently solved using the conjugate gradient method or its variants from the viewpoint of computational effort.

The solution of the simultaneous linear equation using the conjugate gradient method is described, for example, in "Easy-to-Follow Mathematical Optimization (Kore-nara-wakaru saitekika-suugaku)" by Kenichi Kanaya, published by Kyoritu Syuppan, page 101 of the 1st edition.

After $\{f_e\}$ is obtained in step 612, the calculated values are returned to the main routine 204 on the calling side.

Figure 8:
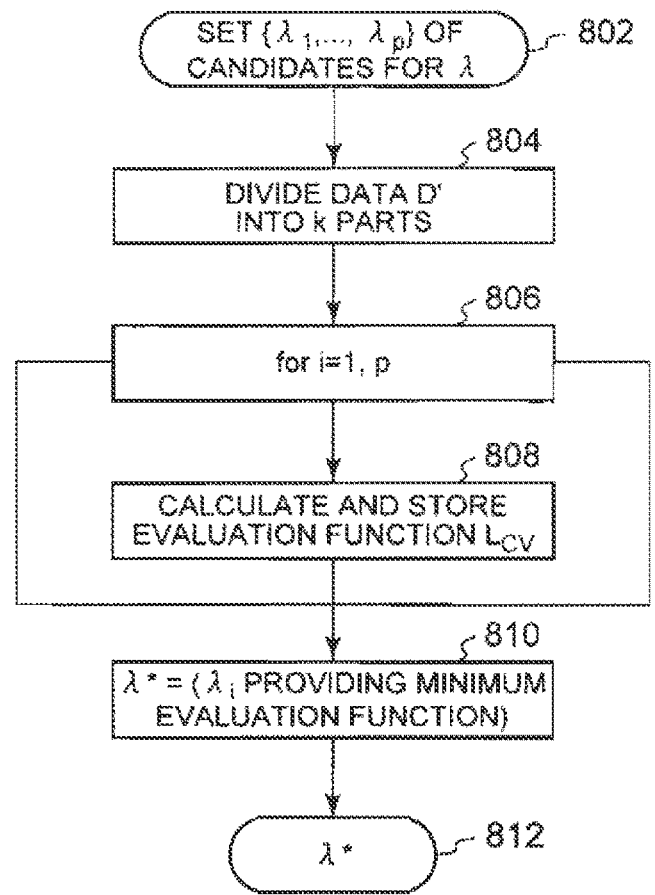
FIG. 8 is a flowchart of $\lambda$ calculation routine processing.

Moreover, referring to the flowchart of FIG. 8, a description will be given hereinbelow of the processing of the embodiment of the $\lambda$ calculation routine 214 based on the k-fold cross validation applied unless $(\alpha, \beta) = (2, 2)$.

In the first step 802, a set $\{\lambda_1, \ldots, \lambda_p\}$ of the candidates for the value of $\lambda$ is prepared. While the optimal value of $\lambda$ depends on the nature of data, $\lambda$ frequently takes a value on the order of 1. Therefore, as initial values, for example, $\{10^{-2}, 10^{-1}, 1, 10^1, 10^2\}$ are able to be given.

In the next step 804, the data D' is divided into equal k parts. For example, if there are 1000 samples in the data (N=1000) and k=5, the data is divided into equal-sized parts each having 200 samples of the data. Each part of the data is denoted by $D'_1, \ldots, D'_k$ and the number of samples of the data included in each part is denoted by $N_1, \ldots, N_k$.

Then, as shown in step 806, the following evaluation function is calculated in step 808 with respect to each candidate value of $\lambda$ where $i = 1, \ldots, p$:

$$L_{CV} \equiv \frac{1}{k} \sum_{s=1}^{k} \frac{1}{N_s} \sum_{n \in D'_s} |y^{(n)} - q^{(n)T} f_{[-D'_s]}|^2 \quad \text{[Eq. 13]}$$

In the above, $f[-D'_s]$ is the solution obtained by using data excluding the s-th data $D'_s$. With the above processing, it is possible to select the optimal $\lambda$ value out of the candidate values in step 810. The optimal value of $\lambda$ is the one that gives the minimal value of the evaluation function. The $\lambda$ value selected in this manner is returned to step 608 in FIG. 6 in step 812. For a better estimation of $\lambda$, this process can be repeatedly applied. For example, if the optimal value is found to be between $10^{-1}$ and 1, a finer set of candidates such as $\{0.1, 0.3, 0.6, 0.9\}$ can be input again, so that this subroutine is able to identify a better optimal value. In this manner, it is possible to determine the optimal value of $\lambda$ with an arbitrary level of resolution. In addition, this processing for higher resolution of the solution can be performed in a completely automated manner, given a level of resolution.

Subsequently, referring to the flowchart of FIG. 9, a description will be given below of the processing of the $\lambda$ calculation routine 214 applied if $(\alpha, \beta) = (2, 2)$. In step 902 of FIG. 9, a set $\{\lambda_1, \ldots, \lambda_p\}$ of candidates for the value of X is prepared in addition to the previously-mentioned Q matrix and L matrix. The preparation for the values of $\{\lambda_1, \ldots, \lambda_p\}$ is the same as in the processing of the flowchart shown in FIG. 8.

Particularly, if $(\alpha, \beta) = (2, 2)$, there is a method for finding the optimal $\lambda$ without using the computationally expensive k repeated evaluations. In the k-fold cross-validation, if k is set to be N, the total number of samples, the $\lambda$ calculation routine 214 comes down to find the value of $\lambda$ which minimizes the following evaluation function:

$$L_{LOOCV}(\lambda) \equiv \frac{1}{N} \sum_{n=1}^{N} [y^{\sim(n)} - q^{(n)T} f^{(-n)}]^2 \quad \text{[Eq. 14]}$$

where $f^{(-n)}$ is a solution obtained by using data excluding the n-th sample. This is the evaluation function of so-called leave-one-out cross validation (LOO CV), as indicated by the subscript.

It is well-known that the evaluation function can be transformed as follows:

$$L_{LOOCV}(\lambda) = \frac{1}{N} \|\text{diag}(I_M - H)]^{-1}(I_M - H) y^{(n)}\|^2 \quad \text{[Eq. 15]}$$

Here $I_M$ is an m-dimensional identity matrix and diag is an operator that makes all of the off-diagonal elements zero. Moreover, a matrix H is expressed as follows:

$$H = Q^T [QQ^T + \lambda L]^{-1} Q \quad \text{[Eq. 16]}$$

Figure 9:
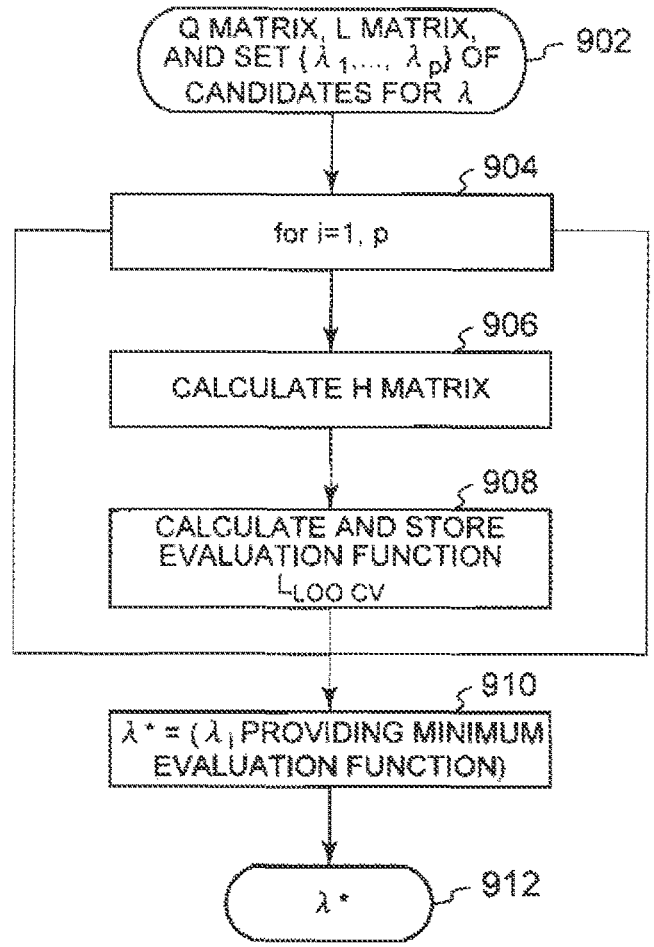
FIG. 9 is a flowchart of $\lambda$ calculation routine processing.

Returning to the flowchart of FIG. 9, step 904 is the processing of repeating step 906 and step 908 with respect to all values of $\lambda_i$ from 1 to p in terms of i.

In step 906, the above matrix H is calculated. In step 908, $L_{LOOCV}(\lambda_i)$ is calculated with respect to $\lambda_i$. After step 906 and step 908 are performed from 1 to p in terms of i, $\lambda$ which minimizes $L_{LOOCV}(\lambda)$ is selected in step 910. The value of $\lambda$ selected in this manner is returned to step 608 of FIG. 6 in step 912.

Returning to FIG. 4, if the main routine 204 determines that $\{f_e\}$ converges in step 410, the processing completes and $\{f_e\}$ is fixed. Then, the variable $f_e$ is given to all links of a target road at this point in time. Therefore, a user specifies the origin and the destination with the keyboard 110 or the mouse 112 while viewing the display 114. Then, the main routine 204 performs processing of finding the shortest route x between arbitrary two points on the road 302 by an arbitrary method such as the Dijkstra method by using the parameter $\{f_e\}$ corresponding to the link cost on the data of the original map.

Upon finding the shortest route x, the cost which is the travel time is obtained from the route by the following equation as has been described:

$$C(x) = \sum_{e \in x} c_e(f_e) \quad \text{[Eq. 17]}$$

The route and cost obtained in this manner are displayed on the display 114 by the data output routine 210.

While the description has been made for the case where a single value of $f_e$ is allocated to each link in the above embodiment, the present invention is not limited thereto. For example, it is possible to handle multiple weights on a link by defining more weights $f_e$ accordingly. For example, if there is a need for taking account for the direction of a road, the weight can be assigned per direction. This is particularly useful when a link is on a slope.

In addition, this formulation is useful to analyze one-way streets. This can be done by eliminating the weight corresponding to the opposite direction of one-way links.

The description has been made for a case where past historical data provides no route in the above example. If the past historical data contains route information even if only partially, however, it is only necessary to select a route for passing the actual route of the route information.

Moreover, the past historical data D may be classified into time zones of a day such as D (morning), D (daytime), D (evening), and D (nighttime) and predictive models of cost functions may be made individually.

Further, the objective function, $\Psi_{\alpha,\beta}(f|\lambda)$, which is described in the above embodiment, can be used to calculate the link parameter corresponding to the cost as long as training data contains a route between the origin and the destination. Therefore, with the route contained in the training data, the objective function can be used for cost estimation of a link in the graph solely in this calculation process independently of the previous step 406 in the flowchart of FIG. 4.

Moreover, the present invention is applicable not only to a road, but also to an arbitrary example in which a path is represented in a graph structure and the cost is able to be considered in connection with the link.

The invention claimed is:

1. A memory comprising a route cost calculation program stored in the memory for calculating a cost on an arbitrary route in a graph including a plurality of nodes and links connecting the plurality of nodes by using a parameter associated with each link in the graph by processing of a computer on the basis of a plurality of training data sets that each include an origin, a destination, and a route cost value between the origin and the destination on the graph, the route cost calculation program, when executed on a computer, causing the computer to:

initialize a value of the parameter associated with each link in the graph;

recalculate route cost values of the plurality of training data sets by calculating a minimum cost route among all routes from each origin to each destination by using the plurality of training data sets;

recalculate the value of the parameter associated with each link in the graph by solving an optimization problem of an objective function including the recalculated route cost values of the plurality of training data sets, wherein the objective function is defined by the mathematical expression:

$$\Psi_{\alpha,\beta}(f|\lambda) = \sum_{n=1}^{N} \left| y^{(n)} - \sum_{c \in x^{(n)}} c_e(f_e) \right|^{\alpha} + \lambda \sum_{e=1}^{M} \sum_{e'=1}^{M} S_{e,e'} |f_e - f_{e'}|^{\beta}$$

where f is a column vector whose entries are $\{f_e\}$, N is a number of the plurality of training data sets, $y^{(n)}$ is a recorded route cost value from the origin to the destination, $f_e$ is a parameter associated with particular link e, $c_e(f_e)$ is a function of transforming the parameter associated with each link in the graph to the route cost value, $\alpha$ and $\beta$ are integer values, $\lambda$ is a determined positive value between 0 and 1, M is a total number of links on the graph, $S_{e,e'}$ is a similarity matrix S identifying a similarity between a link e and another link e'; and fix the value of the parameter associated with each link in the graph in response to an amount of change in the value of the parameter associated with each link in the graph between before and after the recalculation is equal to or less than a predetermined threshold.

2. The program according to claim 1, wherein the program further causing the computer to:

return to recalculating the values of the plurality of training data sets in response to the amount of change in the value of the parameter associated with each link in the graph between before and after the recalculation is more than the predetermined threshold.

3. The program according to claim 1, wherein the objective function includes a term of a cost loss function and a term of penalty function.

4. The program according to claim 1, wherein $(\alpha,\beta)=(1,1)$.

5. The program according to claim 1, wherein $(\alpha,\beta)=(2,2)$.

6. A route cost calculation system for calculating a cost on an arbitrary route in a graph including a plurality of nodes and links connecting the plurality of nodes by using a parameter associated with each link in the graph by processing of a computer on the basis of a plurality of training data sets that each include an origin, a destination, and a route cost value between the origin and the destination on the graph, the system comprising:

a processor; and a memory coupled to the processor, wherein the memory comprises instructions which, when executed by the processor, cause the processor to:

initialize a value of the parameter associated with each link in the graph;

recalculate route cost values of the plurality of training data sets by calculating a minimum cost route among all routes from each origin to each destination by using the plurality of training data sets; recalculate the value of the parameter associated with each link in the graph by solving an optimization problem of an objective function including the recalculated route cost values of the plurality of training data sets, wherein the objective function is defined by the mathematical expression:

$$\Psi_{\alpha,\beta}(f|\lambda) = \sum_{n=1}^{N} \left| y^{(n)} - \sum_{c \in x^{(n)}} c_e(f_e) \right|^{\alpha} + \lambda \sum_{e=1}^{M} \sum_{e'=1}^{M} S_{e,e'} |f_e - f_{e'}|^{\beta}$$

where f is a column vector whose entries are $\{f_e\}$, N is a number of the plurality of training data sets, $y^{(n)}$ is a recorded route cost value from the origin to the destination, $f_e$ is a parameter associated with a particular link e, $c_e(f_e)$ is a function of transforming the parameter associated with each link in the graph to the route cost value, $\alpha$, and $\beta$ are integer values, $\lambda$ is a determined positive value between 0 and 1, M is a total number of links on the graph, $S_{e,e'}$ is a similarity matrix S identifying a similarity between a link e and another link e'; and fix the value of the parameter associated with each link in the graph in response to an amount of change in the value of the parameter associated with each link in the graph between before and after the recalculation is equal to or less than a predetermined threshold.

7. The system according to claim 6, wherein the objective function includes a term of a cost loss function and a term of penalty function.

8. The system according to claim 6, wherein $(\alpha,\beta)=(1,1)$.

9. The system according to claim 6, wherein $(\alpha,\beta)=(2,2)$.

10. The system according to claim 6, wherein the instructions further cause the processor to:

return to recalculating the values of the training data sets in response to a fact that the amount of change in the parameter between before and after the recalculation is more than the predetermined threshold.

11. A memory comprising a route cost calculation program stored in the memory for calculating a cost on arbitrary route in a graph including a plurality of nodes and links connecting the plurality of nodes by using a parameter associated with each link in the graph by processing of a computer on the basis of a plurality of training data sets that each include an origin, a destination, a route cost value between the origin and the destination on the graph, and a route between the origin and the destination on the graph, the route cost calculation program, when executed on a computer, causing the computer to recalculate a value of a parameter associated with each link in the graph by solving an optimization problem of the following objective function including route cost values of the plurality of training data sets:

$$\Psi_{\alpha,\beta}(f|\lambda) = \sum_{n=1}^{N} \left| y^{(n)} - \sum_{c \in x^{(n)}} c_e(f_e) \right|^{\alpha} + \lambda \sum_{e=1}^{M} \sum_{e'=1}^{M} S_{e,e'} |f_e - f_{e'}|^{\beta}$$

where f is a column vector whose entries are $\{f_e\}$, is a number of the plurality of training data sets, $y^{(n)}$ is a recorded rout cost value from the origin to the destination, $f_e$, is a parameter associated with a link e, $c_e,([[f_{@e},]]f_e)$ is a function of transforming the parameter associated with each link in the graph to the route cost value, $\alpha$ and $\beta$ are integer values, $\lambda$ is a determined positive value between 0 and 1, M is a total number of links on the graph, $S_{e,e}$ is a similarity matrix S indentifying a similarity between a link e and another link e'.

12. The program according to claim 11, wherein $(\alpha,\beta)=(1, 1)$.

13. The program according to claim 11, wherein $(\alpha,\beta)=(2, 2)$.

* * * * *